(12) United States Patent
Takamoto et al.

(10) Patent No.: US 7,315,960 B2
(45) Date of Patent: Jan. 1, 2008

(54) STORAGE AREA NETWORK SYSTEM

(75) Inventors: Yoshifumi Takamoto, Kokubunji (JP); Tatsumi Uchigiri, Kodaira (JP); Takao Sato, Odawara (JP)

(73) Assignee: Hitachi, Ltd., Tokyo (JP)

( * ) Notice: Subject to any disclaimer, the term of this patent is extended or adjusted under 35 U.S.C. 154(b) by 736 days.

(21) Appl. No.: 10/901,046

(22) Filed: Jul. 29, 2004

(65) Prior Publication Data

US 2005/0022057 A1  Jan. 27, 2005

Related U.S. Application Data

(63) Continuation of application No. 09/646,011, filed on May 31, 2002, now Pat. No. 6,792,557.

(51) Int. Cl.
*G06F 11/00* (2006.01)

(52) U.S. Cl. ............................... 714/7; 714/8; 711/162

(58) Field of Classification Search .................... 714/7, 714/8; 711/162
See application file for complete search history.

(56) References Cited

U.S. PATENT DOCUMENTS

| | | | | |
|---|---|---|---|---|
| 5,177,744 | A |  | 1/1993 | Cesare et al. .................. 714/6 |
| 5,212,784 | A |  | 5/1993 | Sparks ........................... 714/6 |
| 5,363,484 | A |  | 11/1994 | Desnoyers et al. .......... 709/212 |
| 5,615,329 | A |  | 3/1997 | Kern et al. ..................... 714/6 |
| 5,675,723 | A |  | 10/1997 | Ekrot et al. .................... 714/4 |
| 5,870,537 | A |  | 2/1999 | Kern et al. ..................... 714/6 |
| 6,353,878 | B1 | * | 3/2002 | Dunham ...................... 711/162 |
| 6,366,987 | B1 |  | 4/2002 | Tzelnic et al. ............... 711/162 |
| 6,385,706 | B1 |  | 5/2002 | Ofek et al. .................. 711/162 |
| 6,393,537 | B1 | * | 5/2002 | Kern et al. .................. 711/162 |
| 6,442,551 | B1 |  | 8/2002 | Ofek ............................ 707/10 |
| 6,449,688 | B1 |  | 9/2002 | Peters et al. ................ 711/112 |
| 6,453,396 | B1 | * | 9/2002 | Boone et al. ................ 711/162 |
| 6,477,591 | B1 | * | 11/2002 | VanderSpek ................. 710/38 |
| 6,535,967 | B1 | * | 3/2003 | Milillo et al. ............... 711/162 |
| 6,571,354 | B1 | * | 5/2003 | Parks et al. ..................... 714/7 |
| 6,601,187 | B1 | * | 7/2003 | Sicola et al. .................... 714/6 |
| 7,178,055 | B2 | * | 2/2007 | Ji et al. .......................... 714/6 |
| 2002/0188711 | A1 | * | 12/2002 | Meyer et al. ................ 709/223 |
| 2003/0033494 | A1 | * | 2/2003 | Fujibayashi et al. ........ 711/162 |
| 2003/0182526 | A1 | * | 9/2003 | Mikkelsen et al. .......... 711/162 |

FOREIGN PATENT DOCUMENTS

| | | | |
|---|---|---|---|
| EP | 1115225 A2 | * | 7/2001 |
| JP | 01220023 | | 9/1989 |
| JP | 3280137 | | 12/1991 |
| JP | 7141308 | | 6/1995 |
| JP | 7248988 | | 9/1995 |
| JP | 08234929 | | 9/1996 |
| JP | 1069357 | | 3/1998 |
| JP | 10069357 | | 3/1998 |
| JP | 10093556 | | 4/1998 |
| JP | 11184641 | | 7/1999 |

\* cited by examiner

*Primary Examiner*—Bryce P Bonzo
(74) *Attorney, Agent, or Firm*—Mattingly, Stanger, Malur & Brundidge, PC.

(57) ABSTRACT

In remote copy systems connected with a dedicated interface, reliability is reduced for the time until the disk system that caused an error will be recovered. Therefore, when an error occurs in a primary disk system, it is replaced with a standby disk system connected to a storage area network. As a result, a remote copy system with high reliability is obtained.

11 Claims, 18 Drawing Sheets

FIG. 6

| 601 | 602 | 603 | 604 |
|---|---|---|---|
| DEVICE ID | DISTANCE FROM HOST | DISTANCE FROM PRIMARY DISK SYSTEM | ATTRIBUTE |
| 01 | 6 | 6 | PRIMARY |
| 02 | 5 | 7 | STANDBY |
| 03 | 7 | 5 | SECONDARY |
| 04 | 8 | 3 | STANDBY |
|  |  |  |  |

FIG. 12

| DEVICE ID (1201) | ATTRIBUTE (1202) | REMOTE COPY OBJECT VOLUME (1203) |
|---|---|---|
| 01 | PRIMARY | VOL1,VOL2,VOL3 |
| 02 | STANDBY | |
| 03 | SECONDARY | |
| 04 | STANDBY | |
| | | |

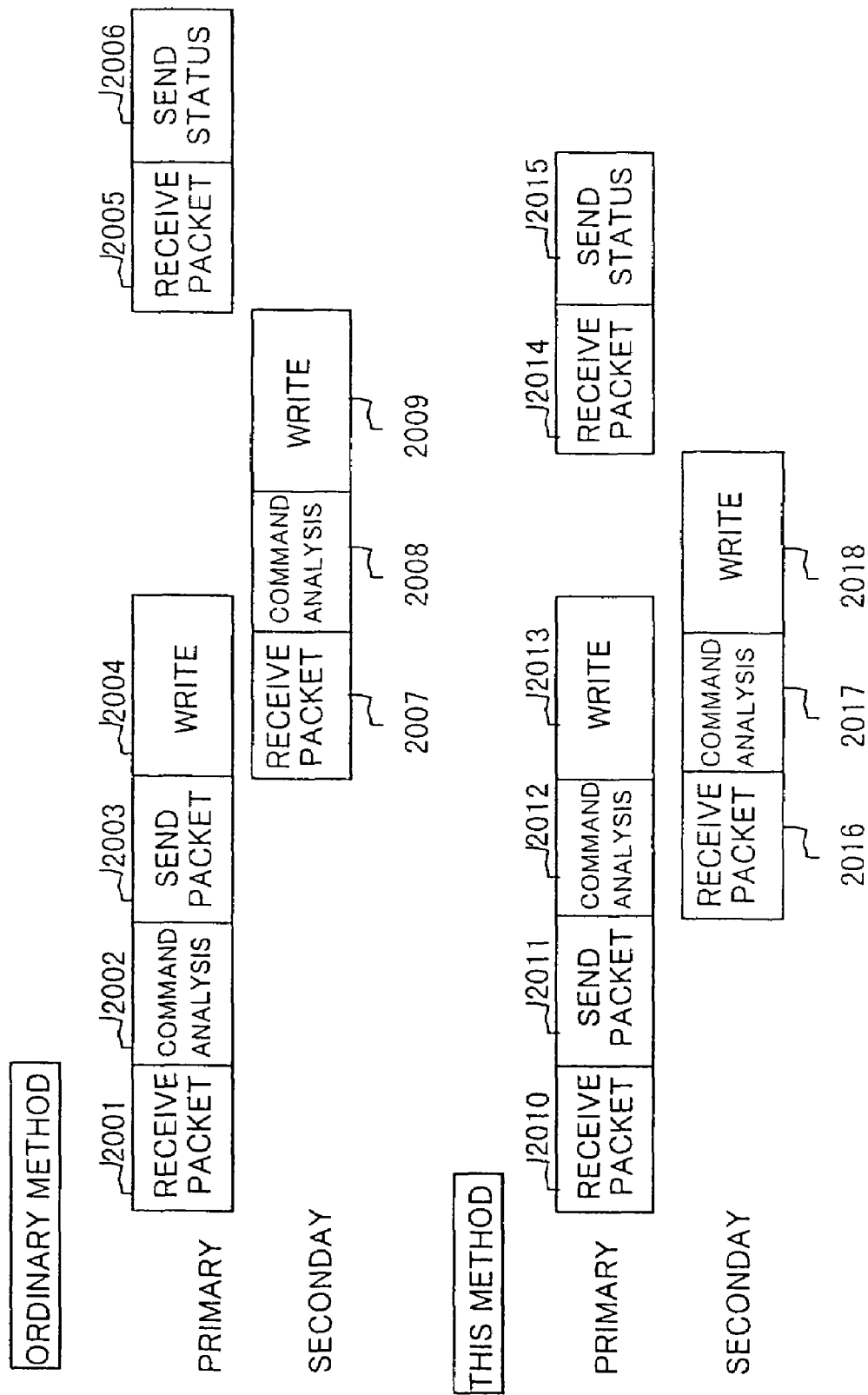

STORAGE AREA NETWORK SYSTEM

The present application is a continuation of application Ser. No. 09/646,011, filed May 31, 2002, now U.S. Pat. No. 6,792,557 the contents of which are incorporated herein by reference.

FIELD OF THE INVENTION

The present invention relates to a storage area network that performs remote copying in the condition that a disk system, which is a storage system, is connected to the storage area network.

BACKGROUND OF THE INVENTION

A magnetic disk unit that has high cost performance is generally used as a device for storing data from a computer. A magnetic disk has a mechanism for reading and writing data by means of magnetic heads that are positioned on both surfaces of each magnetic disk of a plurality of magnetic disks of about 2.5 inch or 3.5 inch size.

The processing time of the magnetic disk, because it operates by mechanical action, is about 10 millisecond, which is slow compared to the processing speed of the processor. There are many cases in which the performance of a system overall does not improve because the processor is made faster but the disk is not made faster. There is the disk array as a means for solving this problem. As described on pages 271-291 of *Understanding I/O Subsystems*, First Edition, by W. David Schwaderer and Andrew W. Wilson, Jr., the disk array is a method that improves performance and reliability by allocating to distribute data to a plurality of drives and also storing redundant data too on the drives. In large-scale systems, a required total capacity of all drives is also large and disk arrays are used because both performance and reliability are required.

The method of achieving high reliability using a plurality of disk arrays over a wide area is described in U.S. Pat. No. 5,870,537 while the disk array increase reliability of the system itself. In U.S. Pat. No. 5,870,537, two disk controllers are connected with a mainframe-dedicated optical interface (ESCON), one is defined as a primary disk system and the other as a secondary disk system. There are two host computers, one is connected to the primary disk system and secondary disk system, and the other is connected to only the secondary disk system. In remote copy, when a write request is issued from the host computer which is connected to the primary disk system, to the primary disk system, the primary disk system transfers the write request to the secondary disk system via the aforementioned ESCON and the same data is stored in the secondary disk system. By doing this, even if an error occurs in the storage on one side, the processing is continued by the storage on the other side. Further, in U.S. Pat. No. 5,870,537, the operations when an error occurs in the remote copy system are described. It is described that if an error occurs in the primary disk system, the processing is continued by switching the path from the host computer to the secondary disk system, and when the primary disk system recovers from the error, switching is made between the secondary disk system and primary disk system.

The disk array is feasible in high-speed processing and the fiber channel is highly expected as an interface for connecting disk arrays and host computers. The fiber channel is superior in performance and connectivity, which are deficiencies of SCSI (small computer system interface) generally used in the prior art. Especially, in connectivity, while SCSI can be extended only to a connection distance of a few tens of meters, the fiber channel can be extended out to a few kilometers. It also allows a few times as many devices to be connected. Because the fiber channel allows connection of a wide variety of devices and host computers, it is appropriate for a local area network that is used in data communications between host computers, which is also called a storage area network. The fiber channel is standardized, and if devices and host computers comply with these standards, they can be connected to a storage area network. For example, it is possible to connect a plurality of disk arrays and a plurality of host computers, which have fiber channel interfaces.

However, in the case of aforementioned U.S. Pat. No. 5,870,537, because the dedicated interface is used to connect the disk systems, it is not appropriate for remote copy via a storage area network. Also, in U.S. Pat. No. 5,870,537, if an error occurs in the primary disk system or the secondary disk system, the pair for remote copy cannot recover until the system that caused the error recovers. This is because the dedicated interface is used for connecting the disk systems. This is because when the systems that are a pair for remote copy are connected with a dedicated interface, data can be transferred only between the disk systems that are connected with the dedicated interface. In addition, in U.S. Pat. No. 5,870,537, if an error occurs in the primary disk system, the host computer processing is continued by means of that the host computer switches the I/O destination to the secondary disk system. However, it requires switching on the host computer side and creates a problem of an increased I/O overhead. Further, in U.S. Pat. No. 5,870,537, the connection paths between the host computers and the disk systems are different from the connection path between the disk systems for remote copy. Therefore, an overhead which flows the paths increases during remote copying.

Moreover, in U.S. Pat. No. 5,870,537, there is no description on the case where the primary disk system has been recovered. However, from the facts that the primary site and secondary site are separated and that the secondary host computer can access only the secondary disk system, it is supposed that the primary host computer switches the I/O destination to the primary disk system when recovered from an error.

SUMMARY OF THE INVENTION

To solve the aforementioned problems, remote copy is performed via a storage area network and also when an error occurs in a storage system for remote copy, a standby storage system connected to the storage area network is assigned as a substitute for the storage system in which the error occurred. Also two host computer adapters that control the connection with a host computer are installed in a disk system which is a storage system. When an error occurs in the primary disk system or the secondary disk system, the processing is performed uninterruptedly by changing the ID of one of the two host computer adapters to the device ID of the disk system that caused the error, without changing the host computer. In addition, a primary disk system that retransfers a command, which has been transferred from a host computer, to the storage area network without changing it, and a secondary disk system that receives a command with an ID different from the own device ID are installed.

BRIEF DESCRIPTION OF THE DRAWINGS

FIG. 6 is a diagram showing the host computer remote copy management table.

FIG. 12 is a table showing the remote copy management for a host computer adapter.

FIG. 20 is a diagram showing the performance comparison.

THE PREFERRED EMBODIMENT OF THE INVENTION

Preferred Embodiment 1

Figure 1:
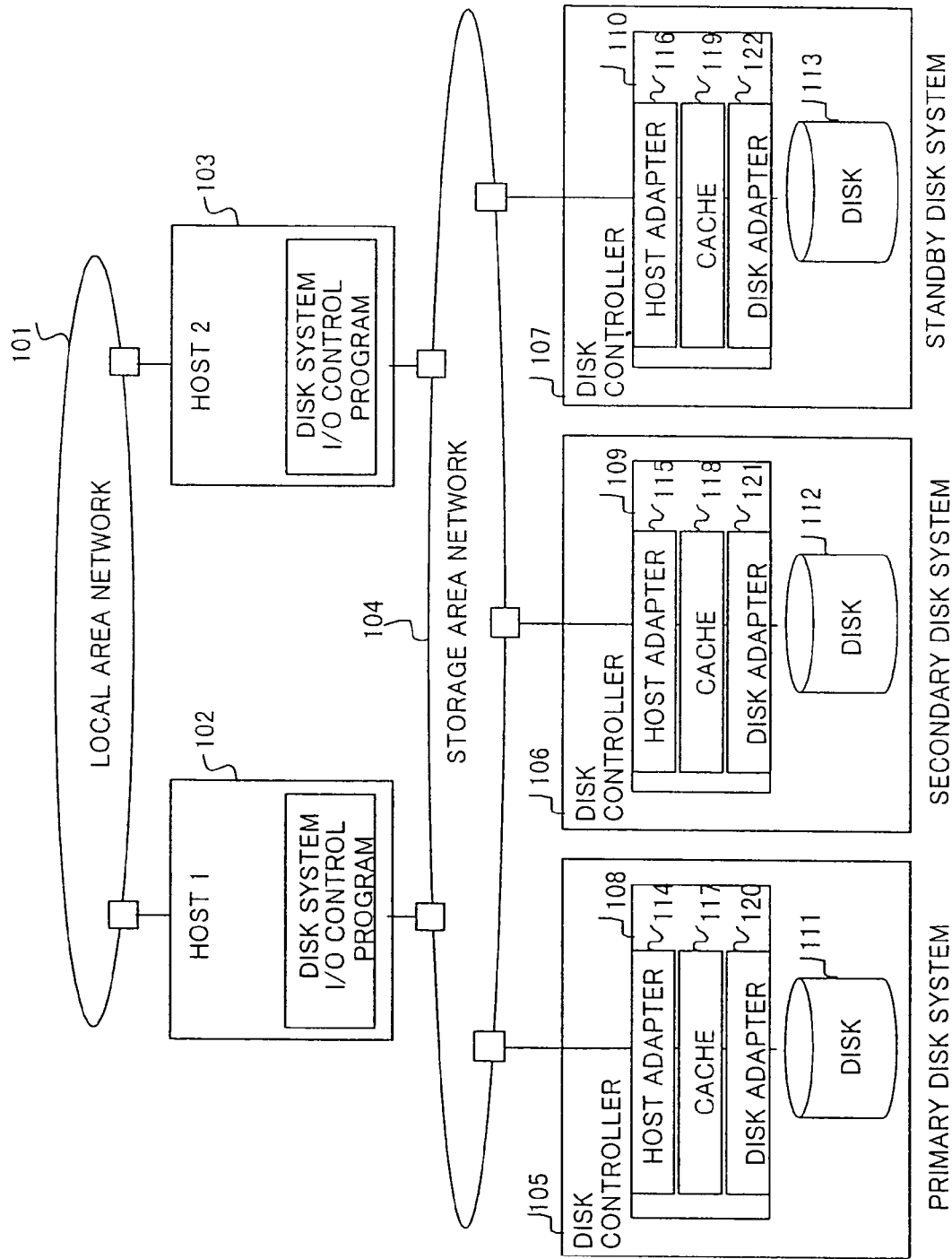
FIG. 1 is a diagram showing the overall configuration in preferred embodiment 1 of the present invention.

FIG. 1 shows a overall configuration diagram of the remote copy system in the storage area network environment of the present invention. Number 101 is a local area network, and numbers 102 and 103 are host computers. Numbers 105, 106 and 107 are disk systems. The host computers 102 and 103 and the disk systems 105, 106 and 107 are connected to a storage area network 104. The local area network 101 is mainly used for communications between the host computers and the storage area network 104 is used for data communications between the disk systems 105, 106 and 107 and the host computers 102 and 103, or the disk systems 105, 106 and 107. Generally, the storage area network 104 has higher data transfer performance than the local network 101. Therefore, the storage area network is more suited for large-scale data transfer. The disk system I/O control program on the host computers 102 and 103 has the function of issuing I/O requests of an application program (not shown in the diagram) that is running on the host computers 102 and 103 to a disk system. The disk systems 105, 106 and 107 are configured with disk controllers 108, 109 and 110 and disks 111, 112 and 113. The disk controllers 108, 109 and 110 are hardware that interprets and performs I/O requests issued from the host computers 102 and 103, and the disks 111, 112 and 113 have the function of storing data transferred from the host computers 102 and 103. The disk controllers 108, 109 and 110 are configured with host computer adapters 114, 115 and 116, caches 117, 118 and 119 and disk adapters 120, 121 and 122. The host computer adapters 114, 115 and 116 have the functions of receiving and interpreting commands issued from the host computers 102 and 103. The disk adapters 120, 121 and 122 have the function of performing input and output for the disks 111, 112 and 113 based on the results of interpretation by the host computer adapters 114, 115 and 116. The caches 117, 118 and 119 are the areas that temporarily store the data read from the disks 111, 112 and 113 and the write data that was transferred from the host computers 102 and 103. When there are requests from the host computers 102 and 103 for another read of the same data, it becomes possible to allow the I/O response to be of high speed by returning the data from the caches 117, 118 and 119 to the host computers 102 and 103. Also, because a write completion is reported to the host computers 102 and 103 when the data is stored in the caches 117, 118 and 119, it allows to be seen like the write was performed at high speed. In FIG. 1, the disk system 105 is the primary disk system in remote copy and the disk system 106 is the secondary disk system. And the disk system 107 is the standby disk system and is a substitute when an error occurs in either the primary disk system 105 or the secondary disk system 106. If the remote copy system is normal, the host computers 102 and 103 issue I/O requests to the primary disk system 105. When write requests are issued from the host computers 102 and 103 to the primary disk system 105, the primary disk system transfers the write data via the storage area network 104 to the secondary disk system 106. As the result, the primary disk system 105 and secondary disk system store the same data. The data transfer from the primary disk system 105 to the secondary disk system 106 is performed without the host computers 102 and 103 being aware of it.

Figure 2:
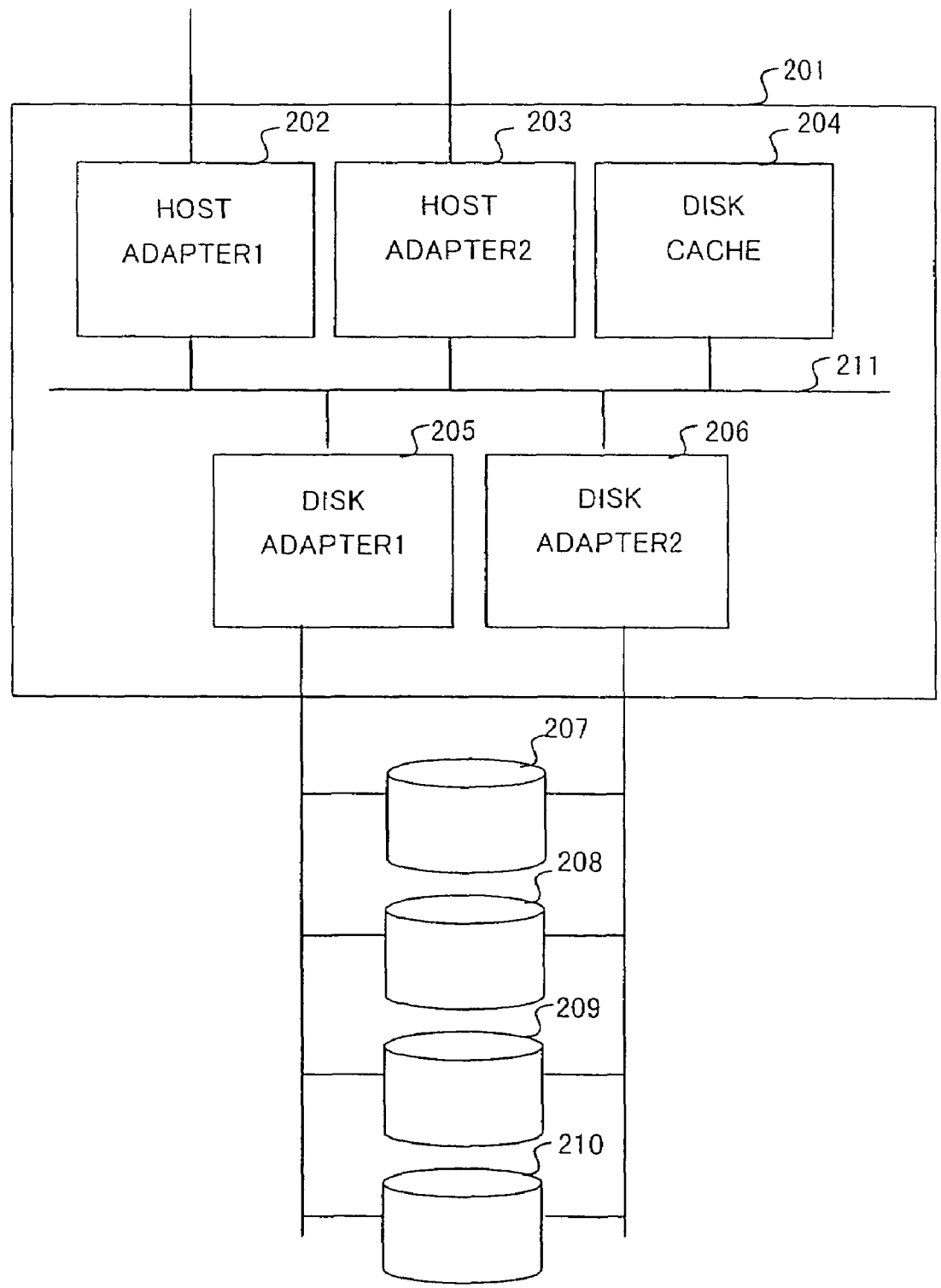
FIG. 2 is a diagram showing the configuration of the disk system.

FIG. 2 shows details of the disk system configuration. The disk systems 105, 106 and 107 are configured with a disk controller 201 and disks 207, 208, 209 and 210. The disk controller is configured with host computer adapters 202 and 203, a disk cache 204 and disk adapters 205 and 206. The host computer adapters 202 and 203, disk cache 204 and disk adapters 205 and 206 are connected with a bus 211, and communication is possible between each configuration element via the bus 211. The host computer adapters 202 and 203 have the functions of receiving and interpreting commands issued from the host computers 102 and 103 and can be installed in a plurality in the one disk controller 201. The disk adapters 205 and 206 have the function of performing I/O for the disks 207, 208, 209 and 210 based on the results of interpretation by the host computer adapters 202 and 203, and can be installed in a plurality in the one disk controller 201 as are the host computer adapters 202 and 203. Installing the host computer adapters 202 and 203 and the disk adapters 205 and 206 in a plurality allows distribution of the processing load and increases reliability.

Figure 3:
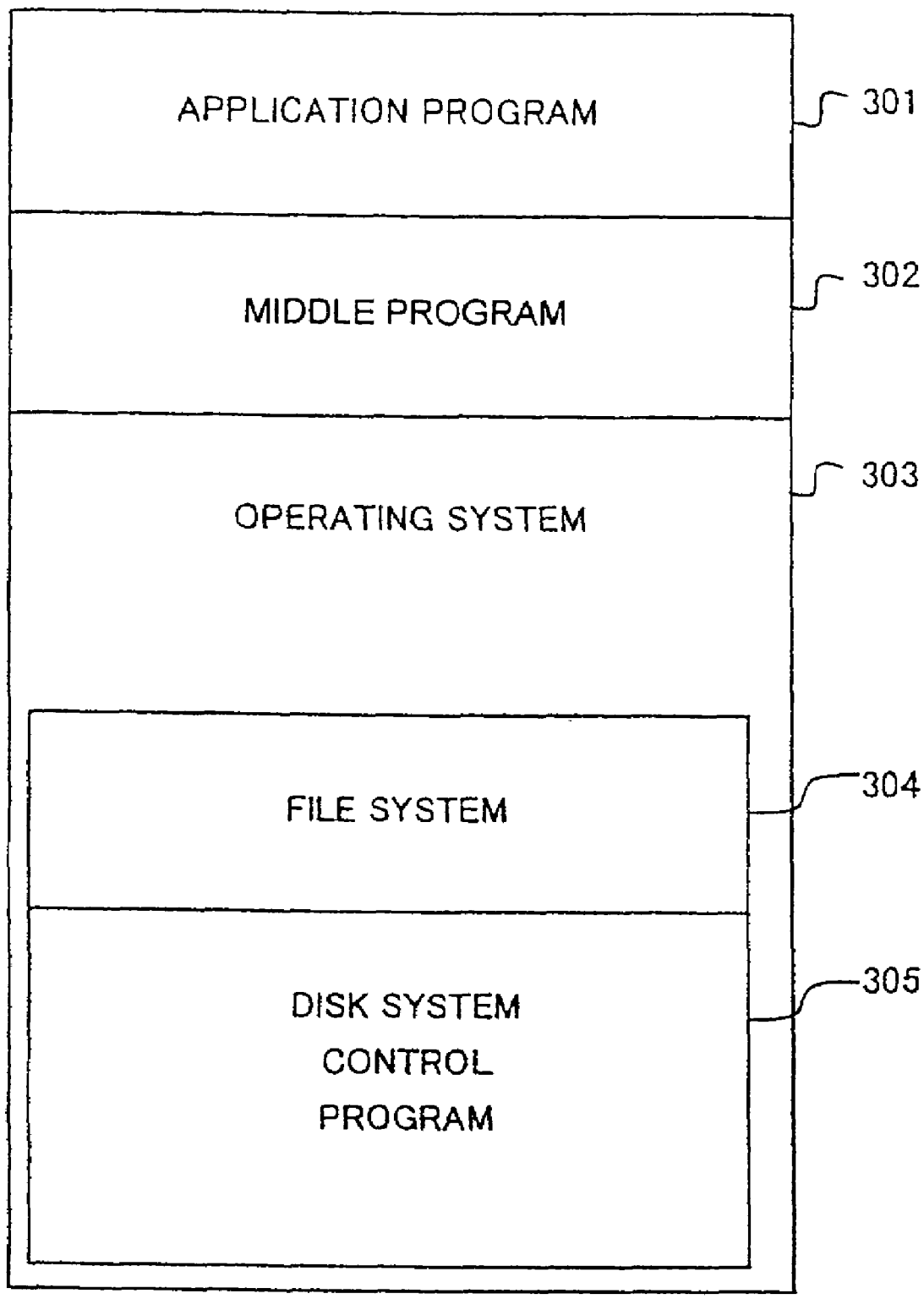
FIG. 3 is a diagram showing the hierarchy of the host computer program.

FIG. 3 shows a structure of programs in the host computers 102 and 103. The program located at the highest level is an application program 301. The application program 301 is a program that is usually written by a user and performs a processing that becomes beginning of I/O requests for the disk systems 105, 106 and 107. The middle program is located between the application program 301 such as a database and an operating system 303. The operating system 303 is a program that manages a host computer and controls hardware. It is located at the lowest level in the program hierarchy of a host computer. The operating system 303 includes a file system 304 and a disk I/O control program 305.

Figure 4:
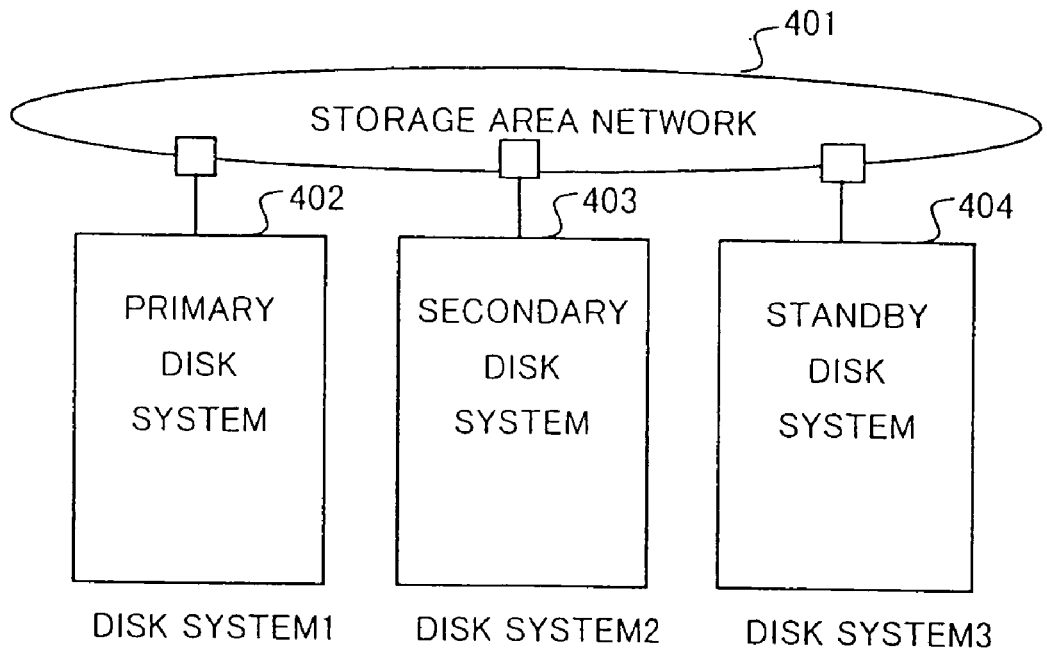
FIG. 4 is a diagram showing the remote copy configuration during normal operation.
Figure 5:
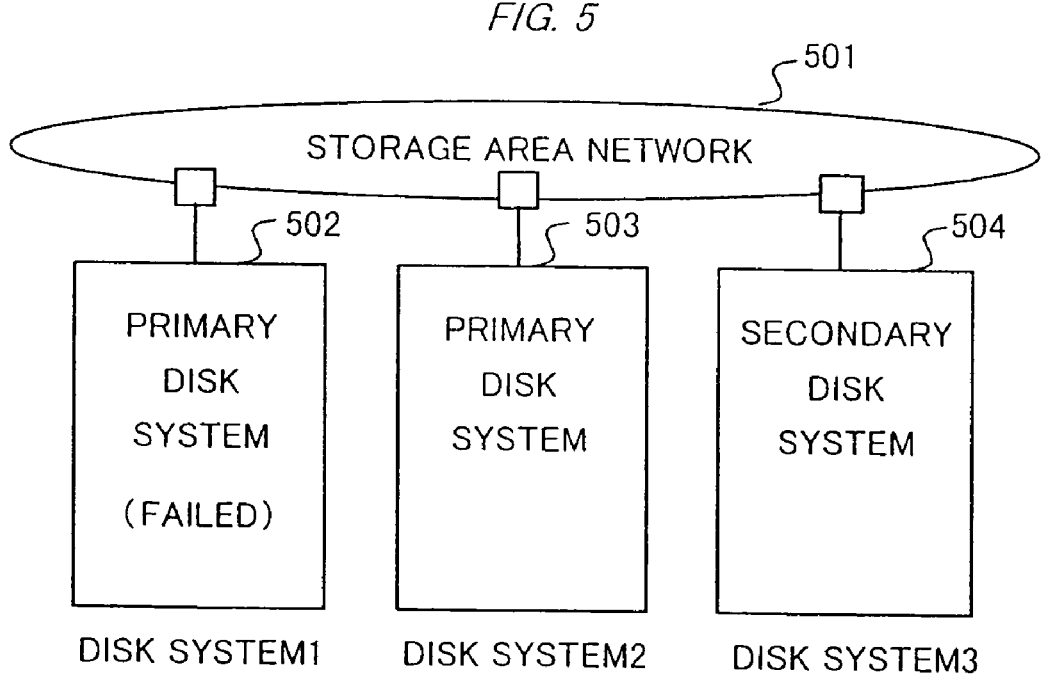
FIG. 5 is a diagram showing the remote copy configuration during error.

FIGS. 4 and 5 show one of the features of the present invention. FIG. 4 shows the remote copy configuration during normal operation in the storage area network 401 environment. The disk system 1 (402) is defined as the primary disk system, the disk system 2 (403) as the secondary disk system and the disk system 3 (404) as the standby disk. FIG. 5 shows how the remote copy definition in the present invention changes when an error occurs in the primary disk system 502. In the present invention, when an error occurs in the primary disk system 502, the disk system that was defined as the secondary system is redefined as the primary disk system and also the standby disk system 504 is defined as the secondary disk system. By doing this, high reliability can be obtained until the disk system in which an error occurred recovers, differing from the conventional systems that cannot be dually configured.

In the present preferred embodiment, the configuration change from FIG. 4. to FIG. 5 is directed by a host computer. The host computer remote copy management table for remote copy, which is shown with FIG. 6, is stored in a host computer. The column 601 indicates disk system device identifiers for remote copy. The column 602 indicates the distances from a host computer. The column 603 indicates the distances from the primary disk system. The column 604 indicates the current attributes. For example, the disk system with the device ID 01 is defined as the primary disk system, and the disk system with the device ID 03 is defined as the secondary disk system to the disk system with the device ID 01. The other disk systems are defined as a standby disk system. The columns 602 and 603 are referred to mainly when standby disks are assigned to the primary disk system and secondary disk system. The remote copy has an important meaning in the holding of the same data at disk systems that are located at a long distance away. If a purpose is to prevent disk system errors caused by errors in operation of disk system configuration parts and firmware, duplicated disk systems can deal with it. However, to prevent the system from becoming inoperable due to large-scale power supply problems or disasters, reliability can be increased by locating the duplicated disk systems as far away as possible. This is because the probability of a simultaneous occurrence of errors can be reduced. In the conventional remote copy systems, because a remote copy dedicated interface cable was installed, the systems could not be changed frequently. For this reason, there is no need for information of distances of the columns 602 and 603. However, in the remote copy system in the storage area network environment of the present invention, the configuration can be changed dynamically. Therefore, when adding a new configuration to the remote copy system, it is necessary to select an appropriate disk system from knowing where disk systems are located.

Figure 7:
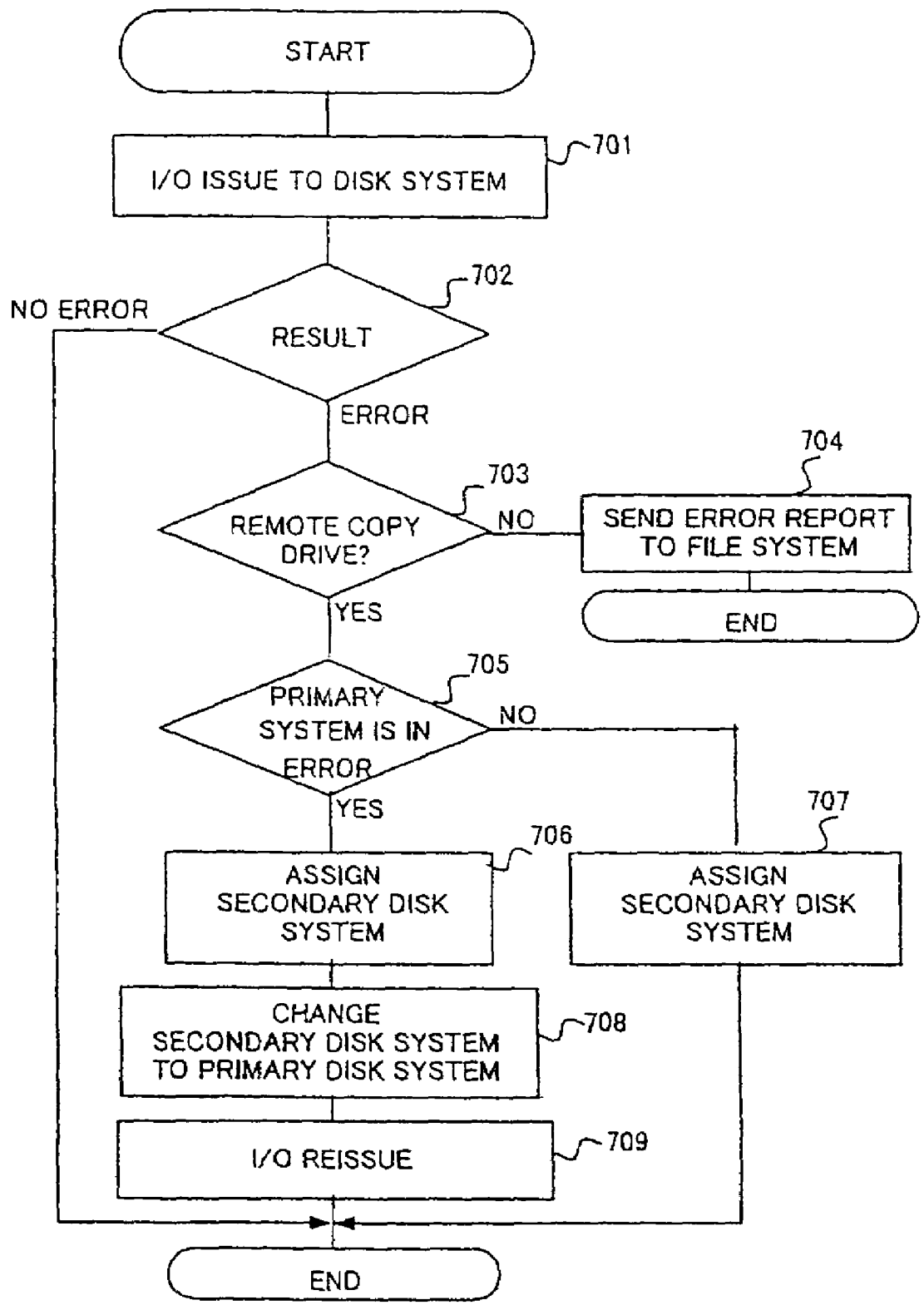
FIG. 7 is a flow chart showing the flow of the disk system control program.

FIG. 7 shows the flow of the disk system I/O control program on the host computers 102 and 103. In step 701, an I/O request is issued to the disk system. The termination of the I/O request issued in step 701 is judged in step 702. In the case that it was normally terminated, this program ends. In the case that it was not normally terminated, the program proceeds to step 703. Whether the I/O system that caused an error has been defined as the remote copy is judged in step 703. This can be judged by referring to the host computer remote copy management table of FIG. 6. If the I/O system has not been defined as the remote copy, the program proceeds to step 704, and an error is reported (step 704) to the file system (304 in FIG. 3). On the other hand, if the system that caused an error is one of the configuration elements of the remote copy system, the program proceeds to step 705. In step 705, whether the I/O system that caused an error is the primary disk system is judged. This can be judged by referring to the host computer remote copy management table of FIG. 6. In the case that the primary disk system caused an error, the program proceeds to step 706, and if not so, the program proceeds to step 707. In step 706, a standby disk system is defined as the secondary disk system. In this step, the update and change of the host computer remote copy management table of FIG. 6 is informed to each disk system. In step 708, the disk system that has been the secondary disk system up to now is redefined as the primary disk system. In step 709, the I/O request that caused an error is reissued. On the other hand, step 707 is performed when the secondary disk system causes an error and means that the secondary disk system is assigned in the same way as in step 706. By doing this, even if an error occurs in the primary disk system, the remote copy system configuration can be immediately reconstructed.

Figure 8:
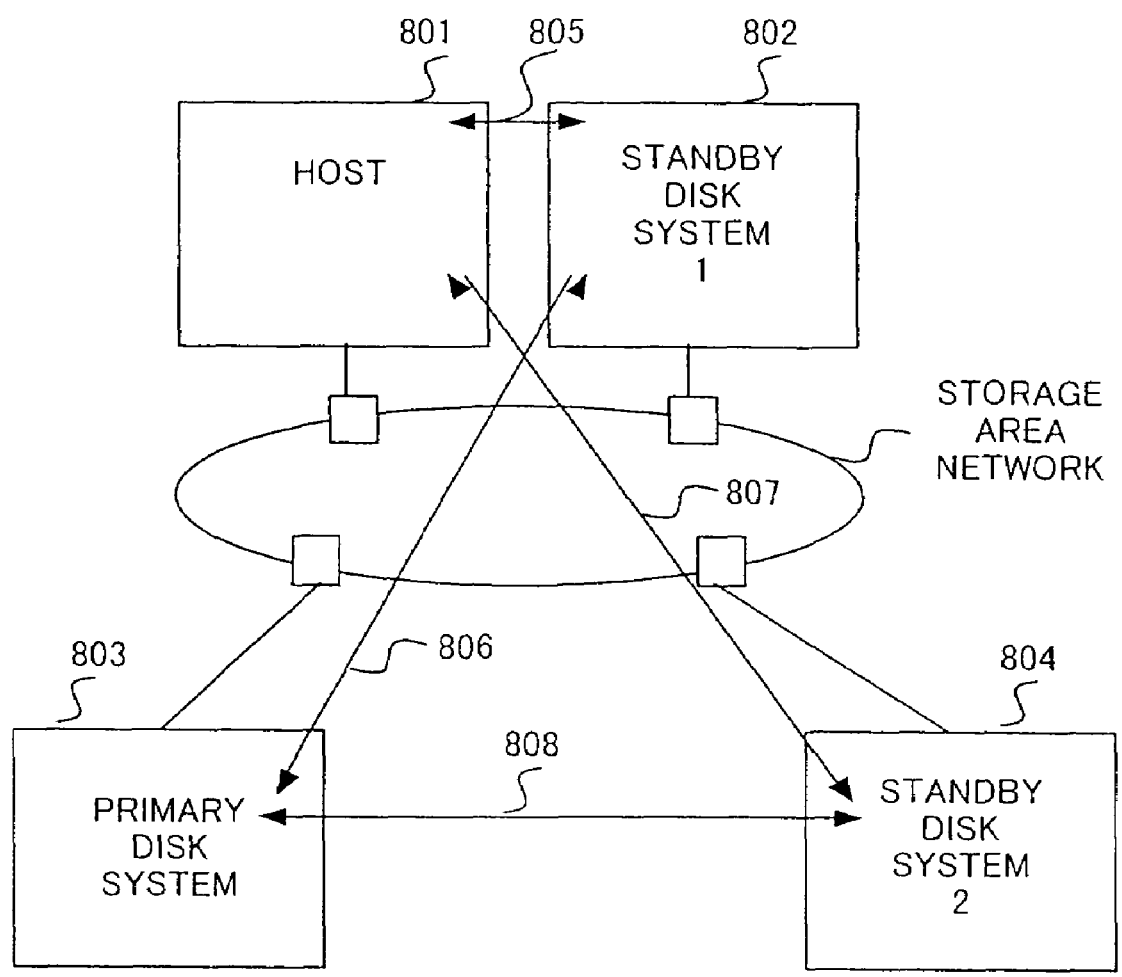
FIG. 8 is a diagram showing the distance-relationships between the storage area network and systems.
Figure 9:
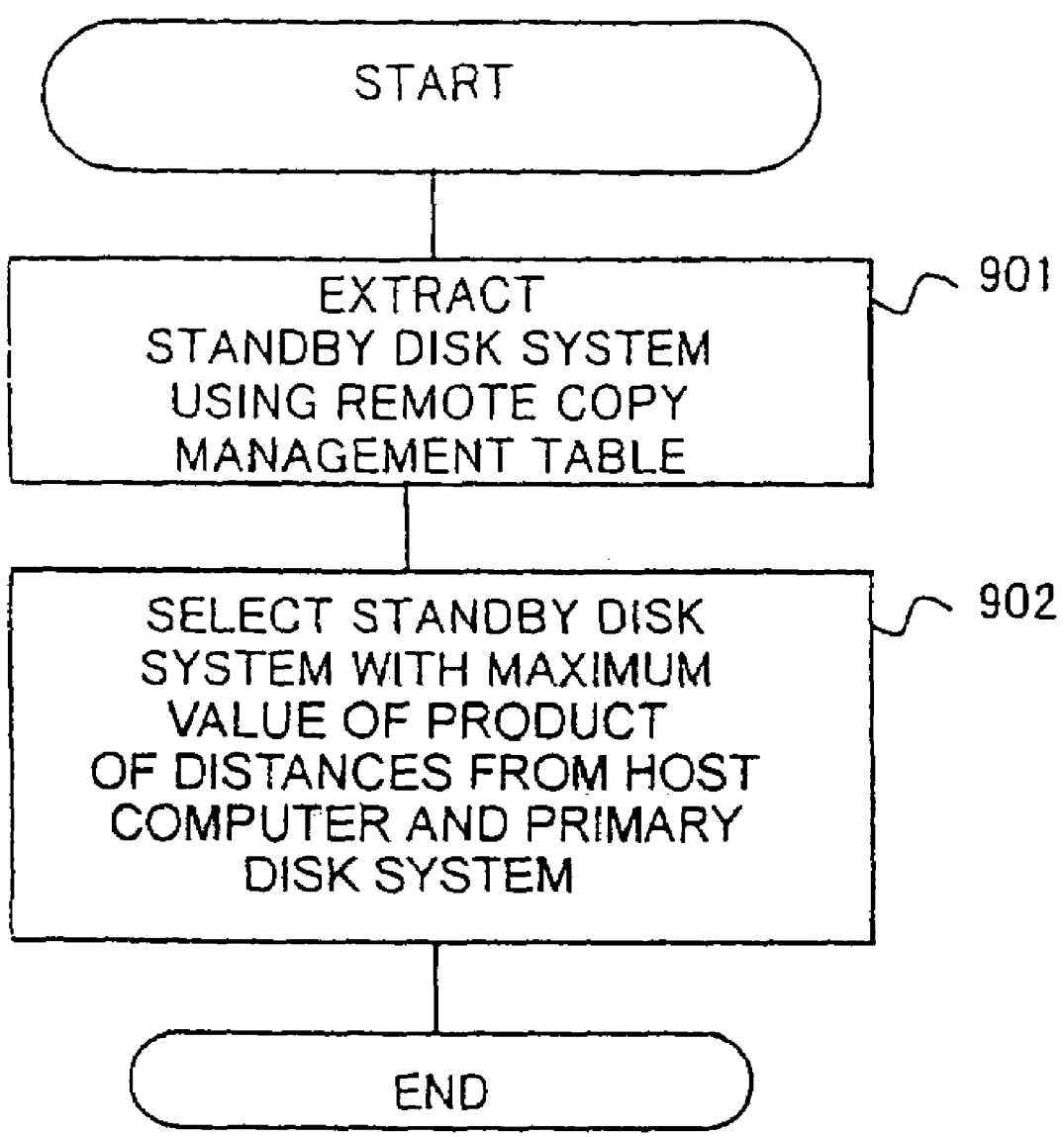
FIG. 9 is a flow chart showing the secondary disk system selection procedure.

FIGS. 8 and 9 show the method of adding a standby disk system to the remote copy system in the present invention. Number 801 in FIG. 8 is the host computer, number 803 is the primary disk system, and numbers 802 and 804 are standby disk systems. For example, when a secondary system is newly added, either number 802 or 804 can be selected. To operate the remote copy system effectively, it is an important index where each configuration element of the remote copy system is located. The remote copy has an important meaning in the holding of the same data at disk systems that are located at a long distance away. If a purpose is to prevent disk system errors caused by errors in operation of disk system configuration parts and firmware, the duplicated disk systems, which does not become aware of distance, can deal with it. However, to prevent the system from becoming inoperable due to power supply problems or disasters, reliability can be increased by locating the duplicated disk systems as far away as possible. This is because the probability of a simultaneous occurrence of errors at the time of a power supply problem or disaster can be reduced by locating the systems at a long distance away. In FIG. 8, the distance (807) between the host computer 801 and the standby disk system 804 is greater than the distance (805) between the host computer 801 and the standby disk system 802. On the other hand, the distance (806) between the standby disk system 802 and primary disk system 803 is almost the same as the distance (808) between the standby disk system 804 and primary disk system 803. If an importance is attached to taking measures against errors by means of locating the systems at long distances away, in the example of FIG. 8, higher reliability can be obtained by assigning the standby disk system 804 as the secondary disk system. FIG. 7 is the flow showing the method of selecting a standby disk system in the present preferred embodiment. In step 901, the disk systems that are defined as the standby disks in the host computer remote copy management table of FIG. 6 are extracted. In step 902, the product of the distances between the standby disk system extracted in step 901 and both the host computer and primary disk system is figured out, and the standby disk system with the largest value of this product is selected. This flow can be applied to steps 706 and 707 in FIG. 7. An effective remote copy system can be constructed by selecting the standby disk in this way. In the present preferred embodiment, not only the distances between the disk systems, but also the distances between the host systems and disk systems can be increased. Because not only the disk systems only, like the conventional remote copy systems, can be located at long distances away between them, but also the disk systems and the hosts can be located at long distances away between them, compared to the conventional remote copy systems, a remote copy system with higher reliability can be provided. One of the important points of the present invention is that when a new configuration is added to the remote copy system in the storage area network environment, it is possible to construct a more efficient system by taking distance into consideration. By doing this, higher reliability can be obtained because the probability of the system becoming inoperable due to power supply problems and disasters can be reduced.

Figure 10:
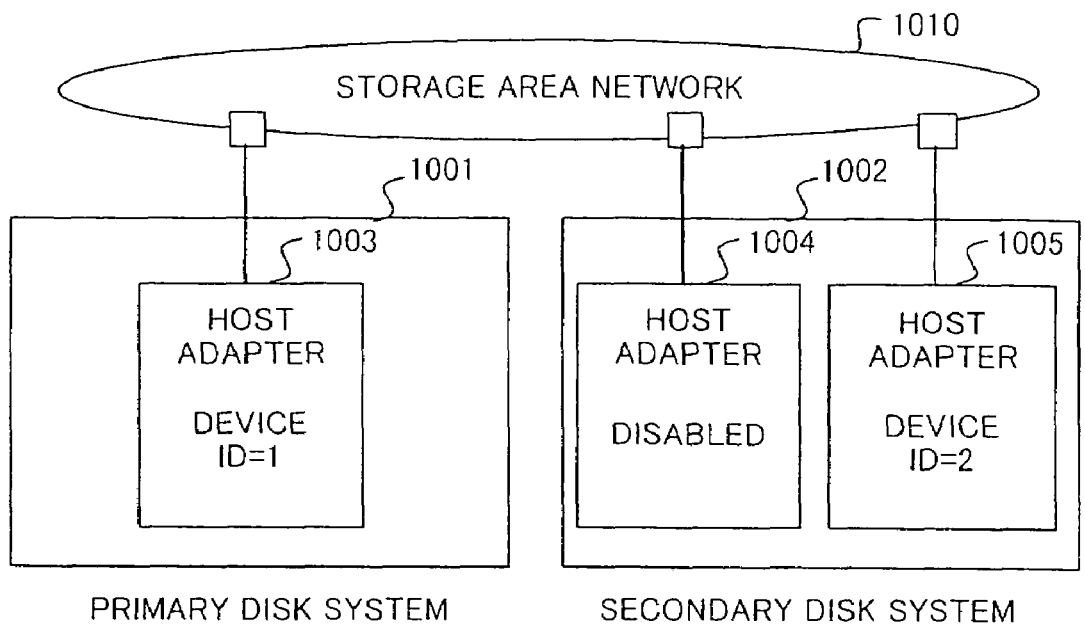
FIG. 10 is a diagram showing the remote copy configuration during normal operation.
Figure 11:
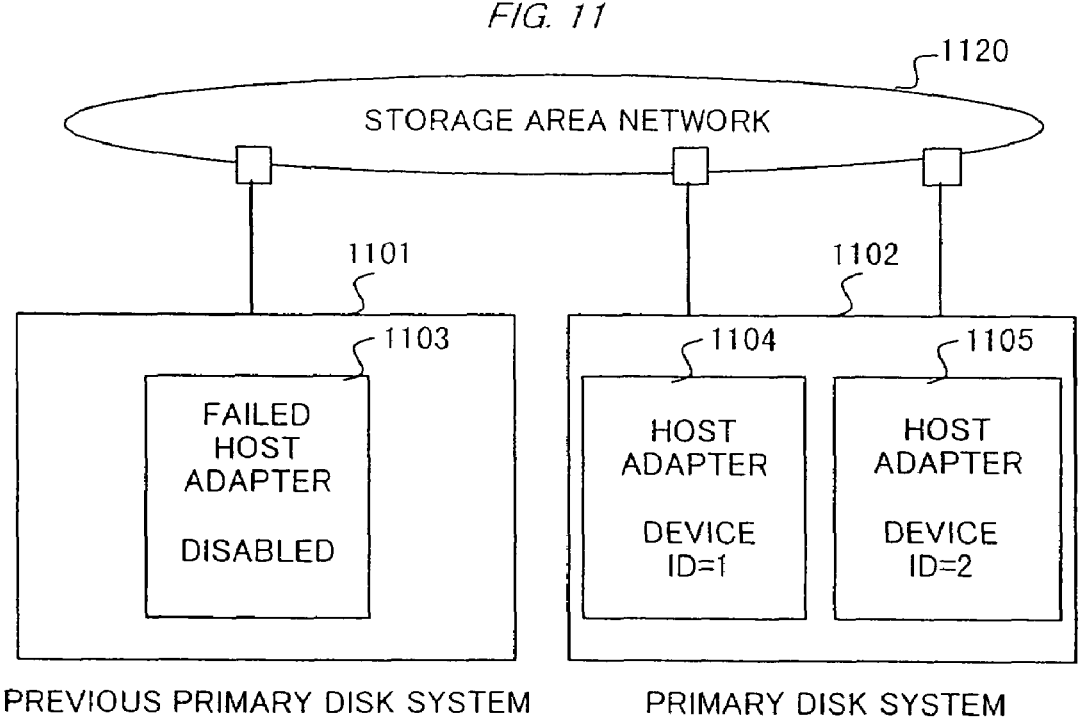
FIG. 11 is a diagram showing the remote copy configuration during error.

FIGS. 10 and 11 show one of the features of the present invention. One of the features of the present invention is that operation can continue without changing any of the programs on a host computer even if an error occurs in the primary system. FIG. 10 shows the remote copy configuration during normal operation in the present invention. Number 1001 is the primary disk system and number 1002 is the secondary disk system. The primary disk system 1001 includes a host computer adapter 1003 and the secondary disk array 1002 includes two host computer adapters 1004 and 1005. Each host computer adapter 1003, 1004 and 1005 is connected to the storage area network 1010. The host computer adapters 1003 and 1005, each has a unique device ID assigned in the storage area network 1010. The device ID of the host computer adapter 1003 is 1 and the device ID of the host computer adapter 1005 is 2. The host computer adapter 1004 is nullified during normal operation. If a write request is issued from a host computer (not shown in the diagram) to the primary disk system 1001, the host computer adapter 1003 performs a remote copy by transferring data via the storage area network 1010 to the host computer adapter 1005. On the other hand, FIG. 11 is a diagram showing that an error has occurred in the primary disk array. In this case, as mentioned above, the disk system that has been operating as the secondary disk system so far, is changed its attribute to the primary disk system. The device ID that the host computer adapter 1103 of the disk system 1101, in which an error occurred, had is transferred to the host computer adapter 1104 in the primary disk system 1102. Further, the host computer adapter 1103 in the disk system 1101, in which an error occurred, is nullified. By doing this, an I/O request issued by a host computer (not shown in the diagram) becomes to be able to be processed in the new primary disk system 1102, and the processing can be continued without changing the various programs on the host computer.

To realize the aforementioned processing, the host computer adapter remote copy management table shown with FIG. 12 is stored in each disk system. The column 1201 is the device ID field, the column 1202 is the attribute field of the remote copy system and the column 1203 is the remote copy object volume field. Even a single disk system, it is general that it can define a plurality of volumes. A user can select whether a remote copy is performed, according to the application of a volume. For this function, the object volumes of the column 1203 are necessary.

Figure 13:
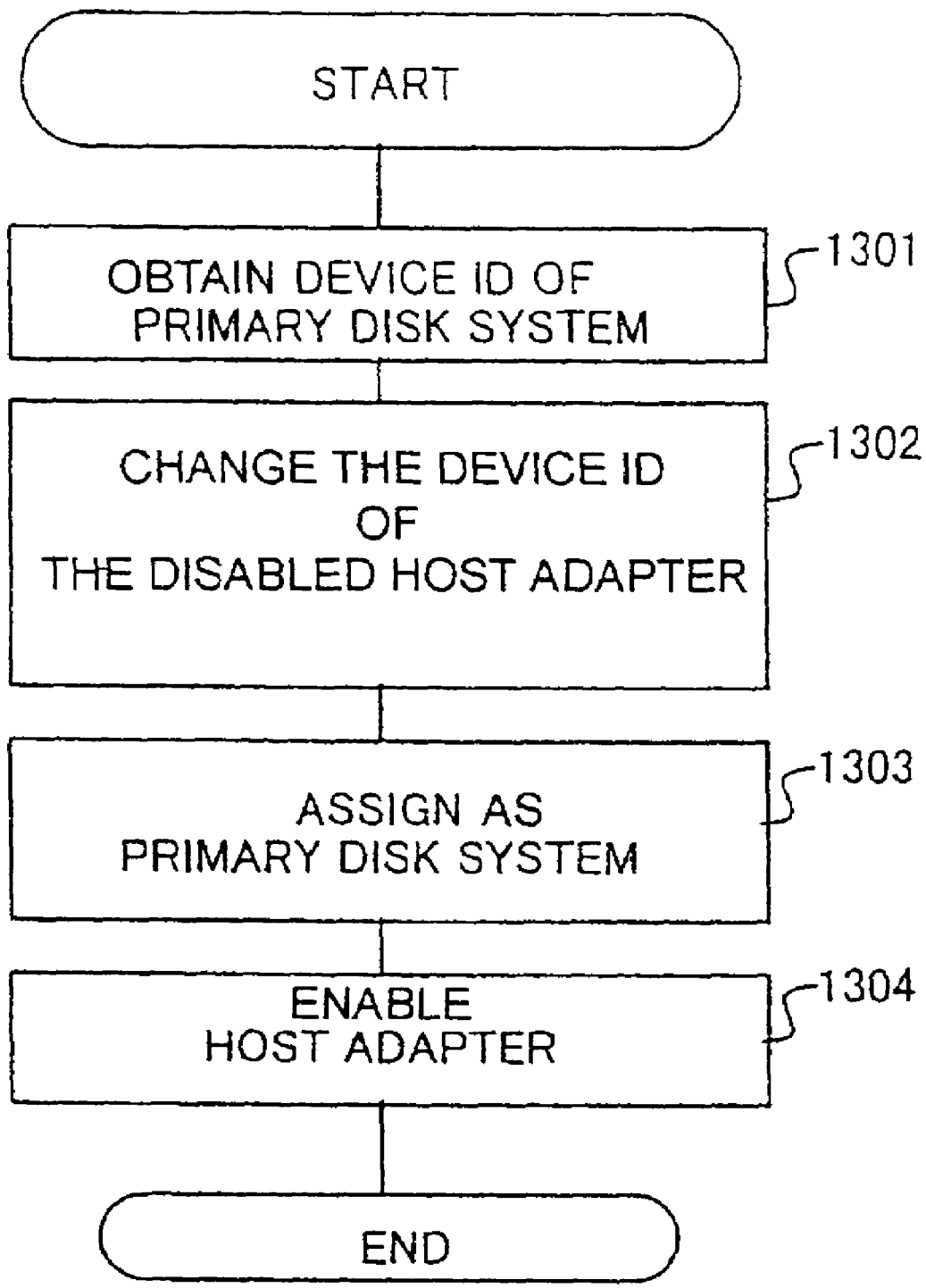
FIG. 13 is a flow chart showing the primary transfer procedure for a host computer adapter.

FIG. 13 shows the flow of the primary transfer procedure that is performed by the host computer adapter in the secondary disk system. In step 1301, the device ID of the primary disk system is obtained. This can be obtained by referring to the host computer adapter remote copy management table of FIG. 12. In step 1302, the device ID of the host computer adapter nullified in the secondary disk system is changed to the device ID that was obtained in step 1301.

In step 1303, the host computer adapter nullified in the secondary disk system is assigned as the primary disk system. In step 1304, the host computer adapter nullified in the secondary disk system is made effective. By doing this, even if an error occurs in the primary disk system, it is not necessary to change hardware and software of the host computer. In addition, it is not necessary either to stop programs running on the host computer.

FIGS. 14 to 20 show the method for realizing a high-speed remote copy, which is one of the features of the present invention. The remote copy in the storage area network environment and the conventional remote copy are very different with respect to those configurations. The conventional remote copy, for example, uses a dedicated cable to perform the data transfer between the primary disk system and secondary disk system. Because of this fact, it has the arrangement in which the connection between the host computer and primary disk system and the connection between the primary disk system and secondary disk system are made with different cables. However, in the storage area network, the host computers, primary disk system and secondary disk system are connected with the same kind of cables. In the conventional remote copy, because the remote copy system was constructed with two different cables, two host computer adapters are required in the primary disk system. A communication overhead between these two host computer adapters caused the performance of the remote copy to deteriorate. In FIGS. 14 to 20, a remote copy with a single host computer adapter is realized and the realization of its high speed will be described.

Figure 14:
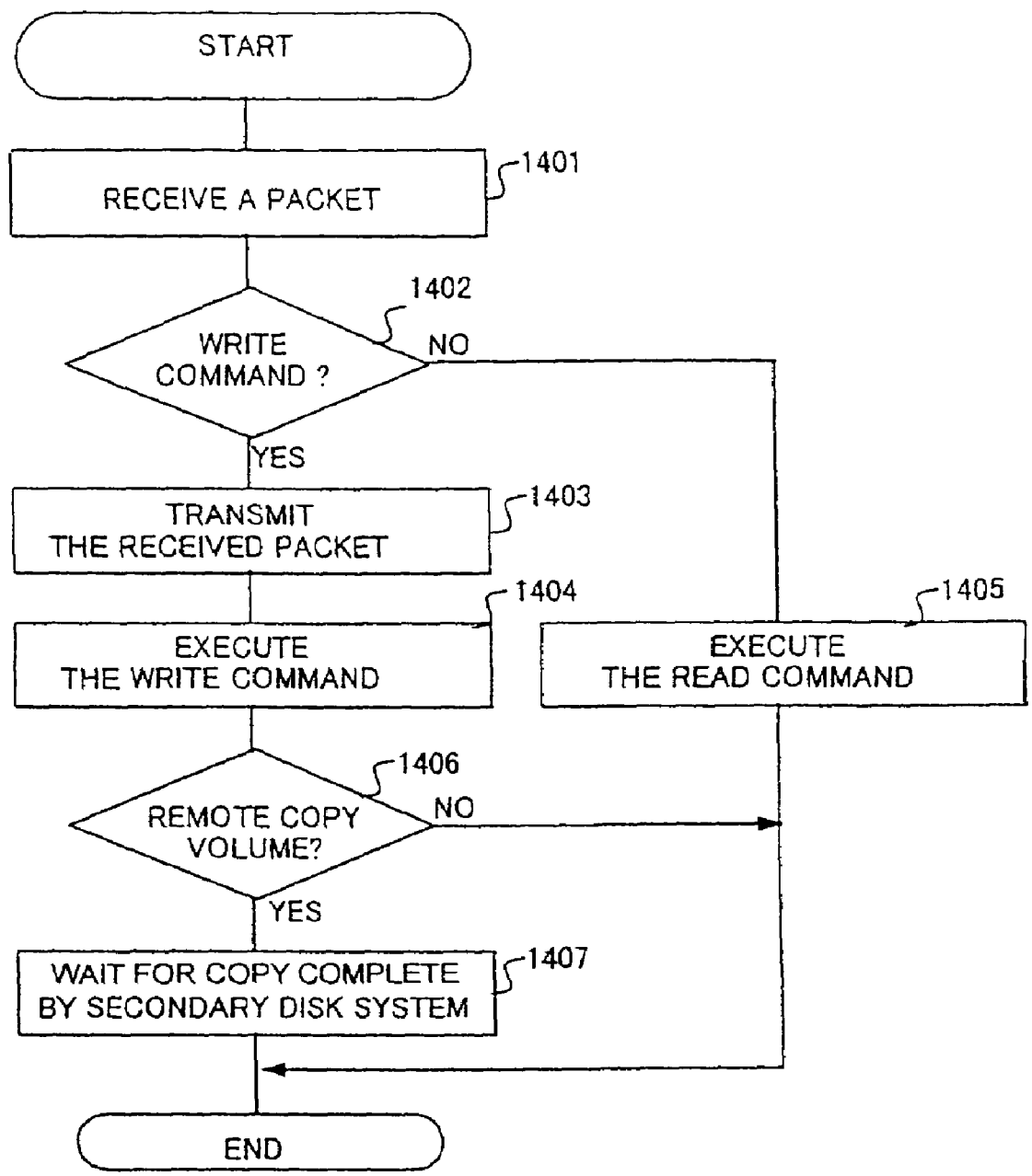
FIG. 14 is a flow chart showing the primary remote copy procedure.

FIG. 14 shows the processing flow in the host computer adapter in the primary disk system. In step 1401, an I/O request transferred in a packet format via the storage area network from a host computer is received. In step 1402, whether the request command is a write request is judged. If it is a write request, the program proceeds to step 1403. If not so, the program proceeds to step 1405. In step 1405, a read request is performed and the procedure ends. In step 1403, the packet received in step 1401 is retransferred to the storage area network. This will be received by the secondary disk system that will be described later. Here, a feature is retransferring the packet received by the primary disk system in an intact format. By doing this, overheads like analyzing a command and changing a packet format can be eliminated. In step 1404, the write command from the host computer is executed in the primary disk system. In step 1406, it is judged whether the write command was executed for an object volume for remote copy. This can be judged by referring to the host computer adapter remote copy management table of FIG. 12. If it is a write for an object volume for remote copy, the program proceeds to step 1407. If not so, the procedure ends. In step 1407, a wait is made for a remote copy complete report from the secondary disk system and after that, the procedure ends.

Figure 15:
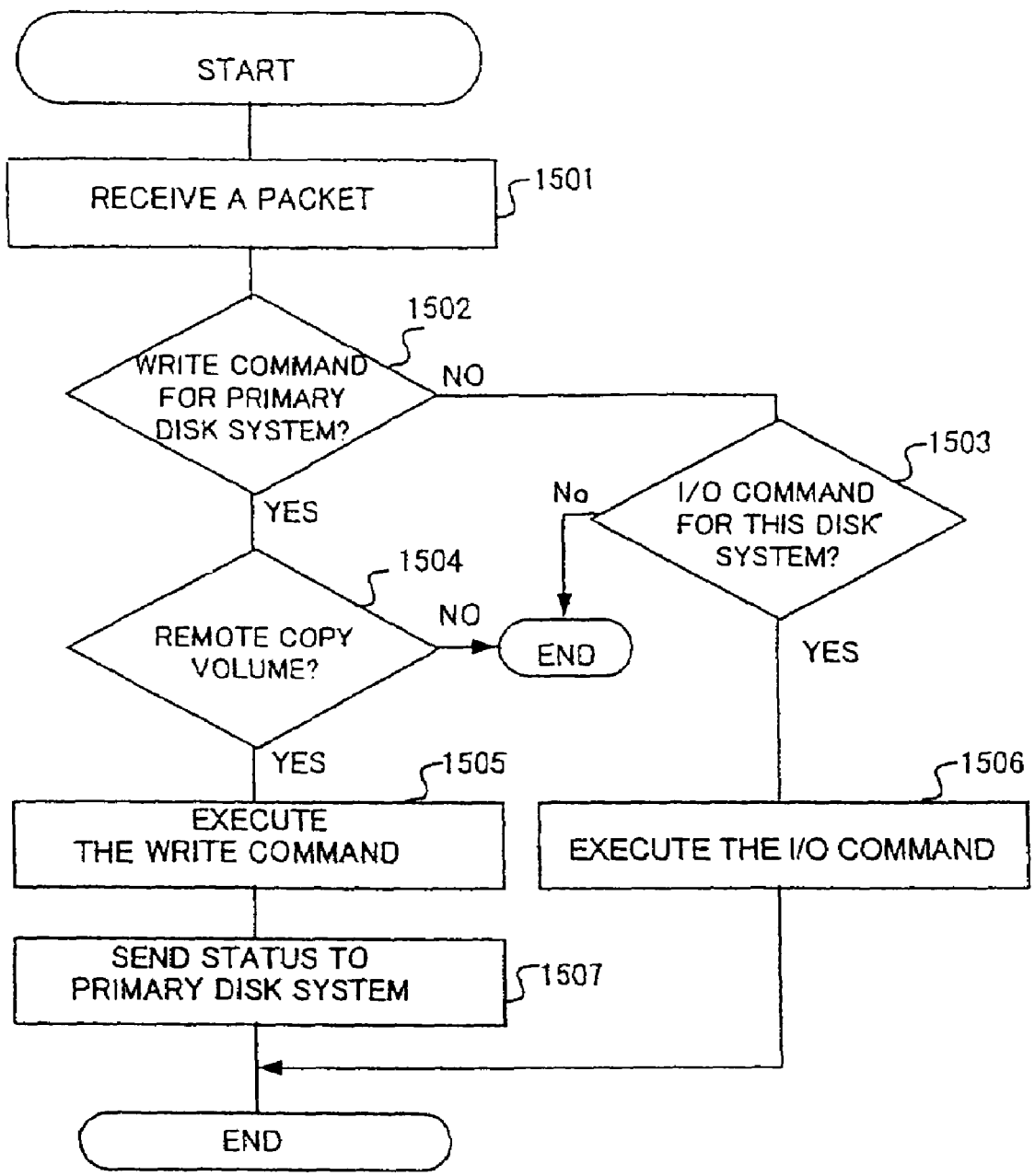
FIG. 15 is a flow chart showing the secondary remote copy procedure.

FIG. 15 shows the flow of the remote copy processing in the secondary disk system. In step 1501, an I/O request transferred in a packet format via the storage area network is received. In step 1502, it is judged whether the transferred I/O request is a write command transferred from the primary disk array. This can be judged by referring to the host computer adapter remote copy management table of FIG. 12. Here, a feature is that, as mentioned above, because the received packet is the one which the primary disk system had received and retransferred as it was, the packet includes information of the primary disk system. Therefore, step 1502 means that the request for the primary disk system is received by the secondary disk system. In step 1504, it is judged whether the received command is for a remote copy object volume. This can be judged by referring to the host computer adapter remote copy management table of FIG. 12. If it is a write for an object volume for remote copy, the program proceeds to step 1505. If not so, the procedure ends. In step 1505, the write is performed according to the received command. In step 1507, the completion of the write processing in the secondary disk system is notified to the primary disk system and the procedure ends. In steps 1503 and 1506, usual I/Os transferred from devices except the primary disk system are performed and the procedure ends.

Figure 16:
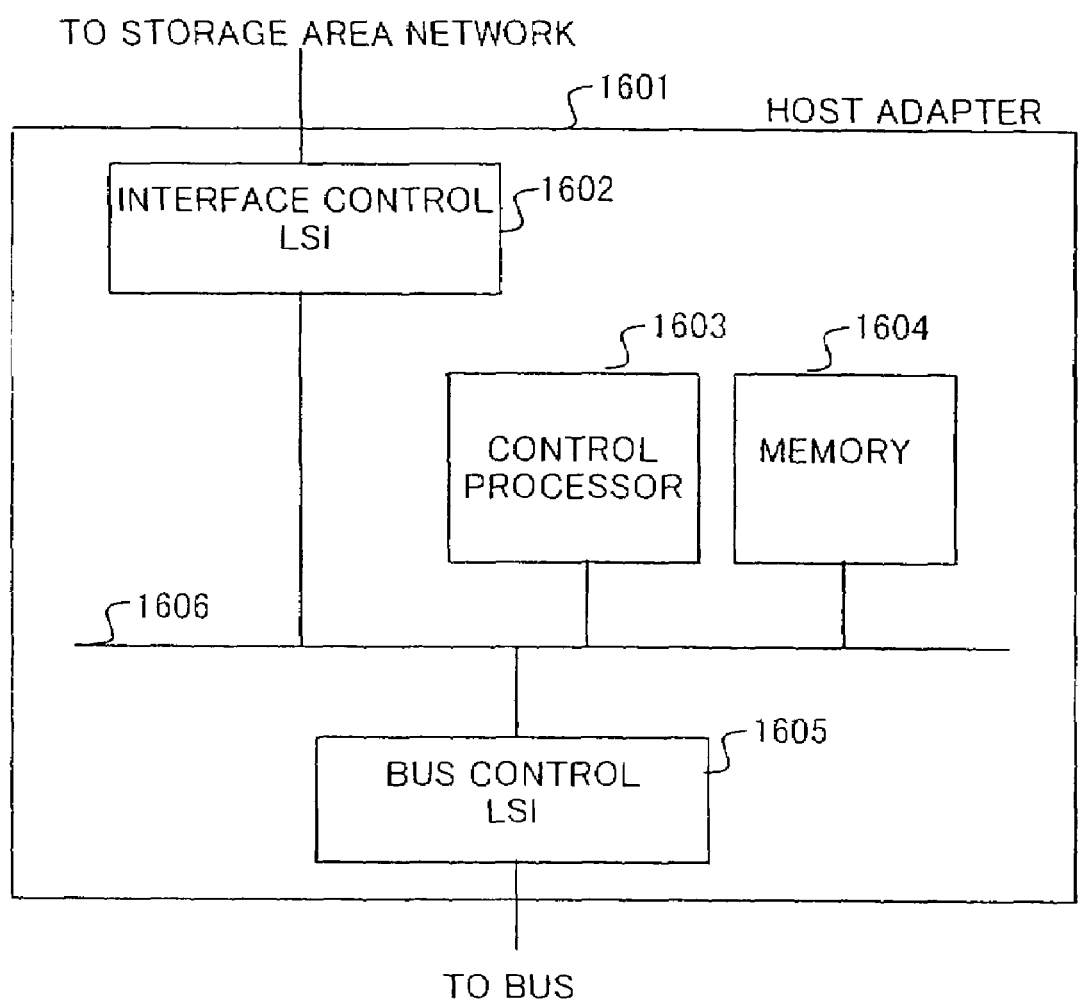
FIG. 16. is a diagram showing the configuration of a host computer adapter.
Figure 17:
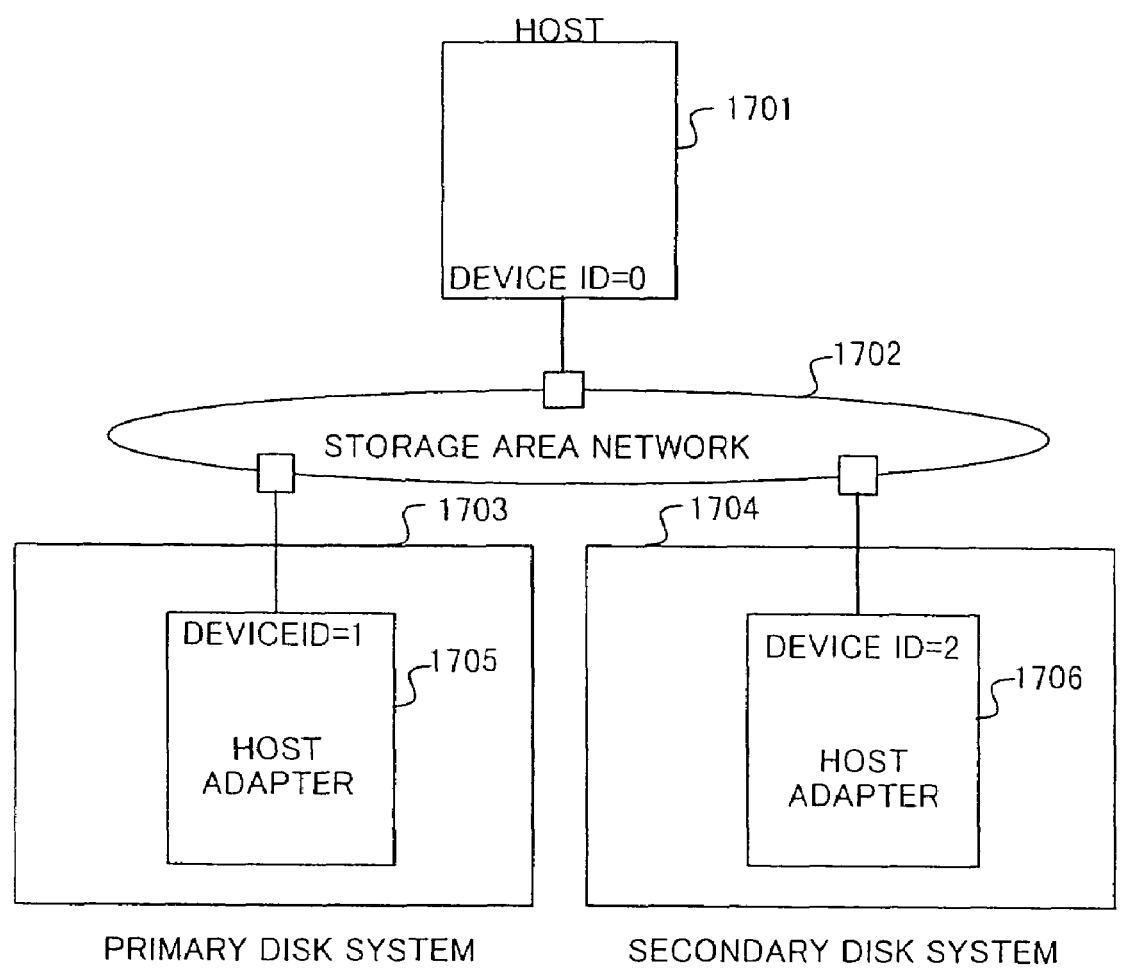
FIG. 17 is a diagram showing an example configuration of the remote copy system.
Figure 18:
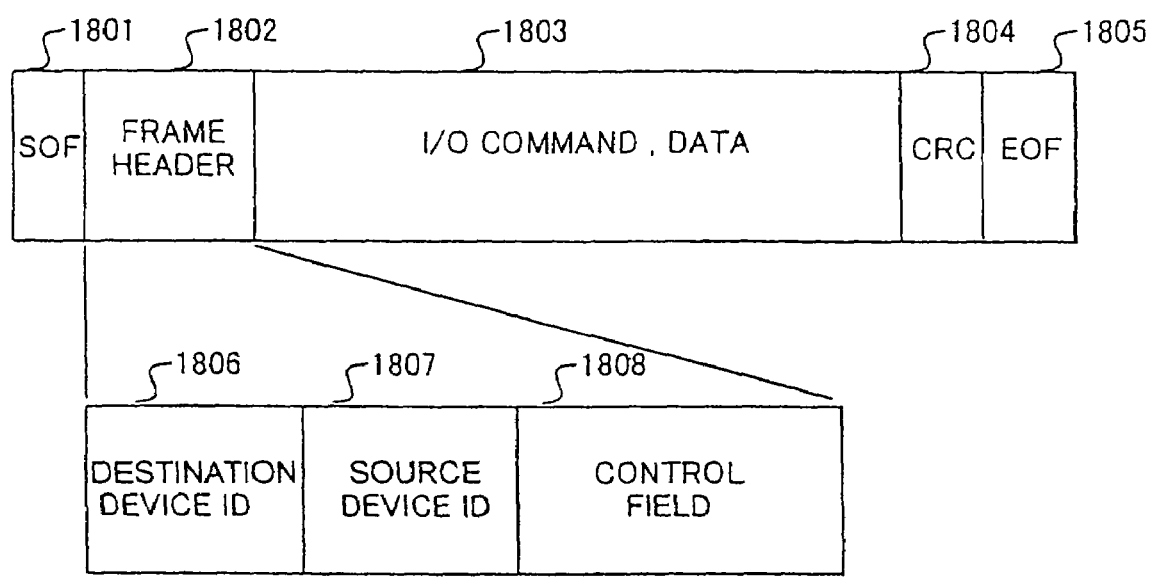
FIG. 18 is a diagram showing the command packet structure.

FIGS. 16, 17 and 18 are diagrams that give detailed descriptions of steps 1501 and 1502 in FIG. 15. FIG. 16 is a diagram that gives further details of the host computer adapter 1601. Number 1602 is an interface control LSI, number 1603 is a control processor, number 1604 is memory and number 1605 is a bus control LSI. The interface LSI (1602) is an LSI that controls communications with the storage area network. Mainly it performs controlling a communication protocol for the storage area network. The control processor 1603 performs the main control of the host computer adapter 1601 and the programs to be executed are stored in memory 1604. The bus control LSI is an LSI that controls the bus (211 in FIG. 2) in the storage system. Steps 1501 and 1502 in FIG. 15 show mainly the processing in the interface control LSI. All the steps except steps 1501 and 1502 in FIG. 15 are executed by the control processor 1603.

FIG. 17 shows an example of the remote copy configuration described in FIGS. 14 and 15. The host computer 1701, primary disk system 1703 and secondary disk system 1704 are connected to the storage area network 1702. The device ID of the host computer 1701 is 0, the device ID of the host computer adapter in the primary disk system 1703 is 1 and the device ID of the host computer adapter in the secondary disk system 1704 is 2. Data is transferred in the packet format shown in FIG. 18 over the storage area network 1702. Number 1801 is a field that indicates the beginning of the frame and number 1802 is the frame header. Number 1803 stores I/O commands and data. Number 1804 stores the codes for checking whether there is no error in packet data. Number 1805 is a field showing the end of the frame. The frame header is structured with the send destination device ID field (1806), send source device ID field (1807) and control field. For example, when a packet is transferred from the host computer 1701 to the primary disk system 1703 in FIG. 17, 1 is stored in the send destination device ID field and 0 is stored in the send source device ID field. I/O commands are stored in number 1803.

Figure 19:
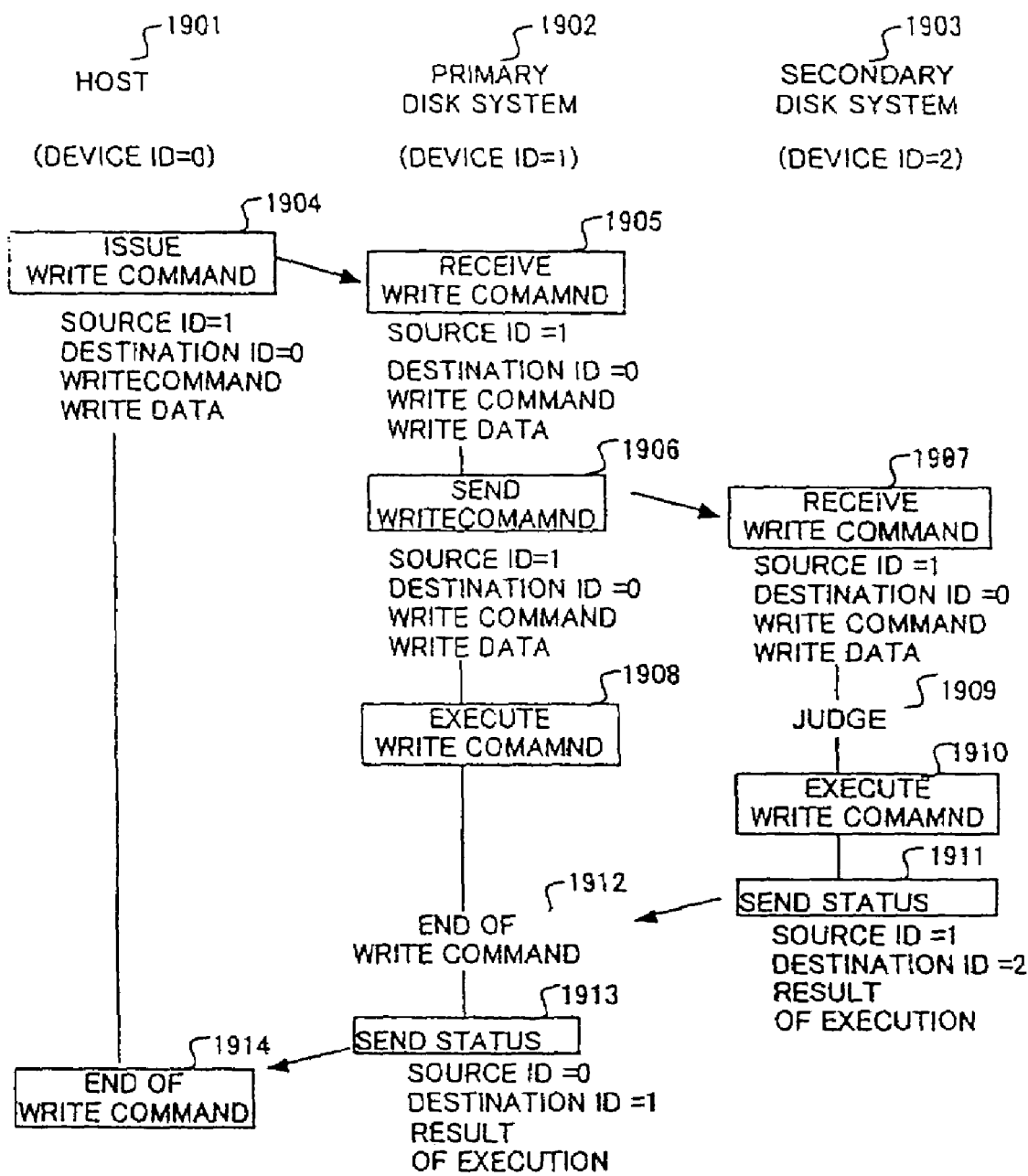
FIG. 19 is a flow chart showing the remote copy procedure.

FIG. 19 shows an example of the operation in one preferred embodiment of the remote copy in the invention. Number 1901 shows the host computer operation, number 1902 shows the operation of the primary disk system and number 1903 shows the operation of the secondary disk system. First, a write command is issued from the host computer (1904). The primary disk system receives this command (1905). 1 of the primary disk system is stored as the send destination ID and 0 indicating the host computer is stored as the send source ID. This command is immediately transferred to the secondary disk system and is received by the secondary disk system (1907). When the primary disk system finishes sending the packet, it starts to execute the write command (1908). The packet received by the secondary disk system is the same in content as the content received in step 1905. Therefore, the send destination ID 1 indicating the primary disk system is stored and the send source ID 0 indicating the host computer is stored. The secondary system receives this packet and judges whether it is a command to be executed (1909). If the command is a command to be executed, it executes that command (1910). When the write processing by the secondary disk system ends, an end report is transferred to the primary disk system (1911). The primary disk system waits for an end notice from the secondary disk system (1912) and confirms the end of the write processings in both the primary and secondary, and issues a write completion notice to the host computer (1913). In this way, the remote copy by the present invention completes (1914).

FIG. 20 is a diagram that compares the performance of the remote copy in the present invention, when processing according to the same flow as the conventional remote copy, with the performance of the conventional remote copy. Up to the present, a packet is received on the primary side (2001), the command is analyzed (2002) and then the packet is sent to the secondary (2003). On the primary side, a write processing is performed (2004) and a wait is made for ending of a write processing on the secondary side (2005). On the secondary side, the packet is received (2007), the command is analyzed (2008), a write processing is performed (2009) and then the end is reported to the primary. On the primary side, an end notice packet is received (2005) and the end of a write processing is reported to the host computer (2006). In contrast to this, in the preferred embodiment of the present invention, on the primary side, after receiving a packet issued by the host computer (2010), the packet is immediately sent to the secondary (2011). On the secondary side, this packet is received (2016), the command is analyzed (2017) and a write processing is performed (2018). On the other hand, on the primary side, after sending the packet to the secondary (2011), the command is analyzed (2012). After a write processing is performed (2013), a wait for the write processing on the secondary side is made (2014) to issue an end notice to the host computer (2015). In the present invention, compared to the processing that follows the conventional method, it is possible to realize a high-speed remote copy response because sending of a packet to the secondary can be expedited.

In addition, as another effect of the present preferred embodiment, there is a sharing of the remote copy system with a plurality of host computers, which was not possible in the conventional remote copy. As FIG. 1 shows, a plurality of host computers (102 and 103) can be connected to the storage area network 104. Each of a plurality of host computers can share the remote copy system with others. Therefore, in the remote copy system described in the present preferred embodiment, for example, even if an error occurs in the host computer 102, by holding the host computer remote copy management table shown with FIG. 6 on the host computer 103, the host computer 103 can take over processing in the same remote copy system configuration as the host computer 102. In the conventional remote copy system, the host computer connected to the secondary disk system could only access the secondary disk system, but in the present preferred embodiment, because each of a plurality of host computers can share the remote copy system with the same configuration, it is possible to construct a remote copy system with higher reliability.

What is claimed is:

1. A system comprising:
   a computer;
   a primary storage system;
   a secondary storage system; and
   a standby storage system, wherein said computer, said primary storage system, said secondary storage system and said standby storage system are connected to each other by a network, wherein said primary storage system performs a remote copy by performing a write in response to a write request from said computer via said network, and transferring a write command to said secondary storage system via said network, wherein said computer sends the write request to said primary storage system, checks whether the write request has terminated in said primary storage system, and judges whether an error has occurred in said primary storage system or said secondary storage system if the write request has not terminated, wherein, if the error has occurred in said primary storage system, then said computer changes said standby storage system into a new secondary storage system, changes said secondary storage system into a new primary storage system and re-sends the write request to said new primary storage system, and wherein, if the error has occurred in said secondary storage system, then said computer changes said standby storage system into a new secondary storage system and re-sends the write request to said primary storage system.

2. A system according to claim 1, wherein said new primary storage system executes the remote copy with said new secondary storage system when said new primary storage system receives the write request re-sent by said computer.

3. A storage system according to claim 2, wherein said computer assigns a device identifier (ID), which was assigned to said primary storage system, to said new primary storage system and assigns a second device ID, which was assigned to said secondary storage system, to said new secondary storage system if the error is occurred in said primary storage system.

4. A system according to claim 1, wherein said primary storage system executes the remote copy with said new secondary storage system when said primary storage system receives the write request re-sent by said computer.

5. A storage system according to claim 4, wherein said computer assigns a device ID, which was assigned to said secondary storage system, to said new secondary storage system if the error occurred in said secondary storage system.

6. A system comprising:
a computer;
a primary storage system;
a secondary storage system; and
a plurality of standby storage systems,
wherein said computer, said primary storage system, said secondary storage system and said standby storage systems are connected to each other by a network, wherein said primary storage system performs a remote copy by performing a write in response to a write request from said computer via said network, and transferring a write command to said secondary storage system via said network, wherein said computer sends the write request to said primary storage system, checks whether the write request has terminated in said primary storage system and judges whether an error has occurred in said primary storage system or said secondary storage system if the write request has not terminated, wherein, if the error is occurred in said primary storage system, then said computer selects one of said standby storage systems, changes said one standby storage system into a new secondary storage system, changes said second storage system into a new primary storage system and re-sends the write request to said new primary storage system, and wherein, if the error has occurred in said secondary storage system, then said computer selects one of said standby storage systems, changes said one standby storage system into a new secondary storage system and re-sends the write request to said primary storage system.

7. A system according to claim 6, wherein said computer calculates distances from each of said standby storage systems to the computer and said primary storage system and selects said one of said standby storage systems which has the largest value of the distances.

8. A system according to claim 6, wherein said new primary storage system executes the remote copy with said new secondary storage system when said new primary storage system receives the write request re-sent by said computer.

9. A storage system according to claim 8, wherein said computer assigns a device identifier (ID), which was assigned to said primary storage system, to said new primary storage system and assigns a second device ID, which was assigned to said secondary storage system, to said new secondary storage system if the error is occurred in said primary storage system.

10. A system according to claim 6, wherein said primary storage system executes the remote copy with said new secondary storage system when said primary storage system receives the write request re-sent by said computer.

11. A storage system according to claim 10, wherein said computer assigns a device ID, which was assigned to said secondary storage system, to said new secondary storage system if the error is occurred in said secondary storage system.

* * * * *